Patented June 15, 1943

2,321,622

UNITED STATES PATENT OFFICE 2,321,622

TREATMENT OF ANIMAL TISSUE

John M. Ramsbottom and Levi S. Paddock, Chicago, Ill., assignors to Industrial Patents Corporation, Chicago, Ill., a corporation of Delaware No Drawing. Application March 10, 1941,
Serial No. 382,589

17 Claims. (Cl. 99—175)

This invention relates to the treatment of animal tissues and has to do particularly with the treatment of flesh and intestines with an enzymic material to improve the value thereof.

One of the objects of this invention is to provide a method whereby animal tissue may be rendered tender and improved in other properties.

Another object of this invention is to provide a method whereby the flesh of edible animal carcasses may be rendered tender.

Another object of this invention is to provide a method whereby animal intestines may be rendered tender and more adaptable for use as sausage casings.

Another object of this invention is to provide a method of treating natural sausage casings to increase the stretchability of the casings and to increase the stuffing capacity of the casings.

Another object of this invention is to provide a method whereby the smoking properties of the casings may be altered.

Another object of the invention is to provide a method whereby such tough casings as hog casings and Indian sheep casings may be tendered to any desired extent and rendered useful in the manufacture of high grade sausage products which require a tender casing.

Other objects and advantages of this invention will become apparent from the description and claims which follow.

The process is applicable to the treatment of various types of animal tissue, such as wholesale or retail cuts of meat, including beef and pork. It is also applicable to the treatment of meat in various degrees of comminution, such as hamburger, sausage and the like. The treatment of sausage may take place before or after the meat is stuffed into casings.

The invention is particularly adaptable to the treatment of hog casings, Indian sheep casings, and beef casings although it is not limited to the treatment of these specific types of materials.

Natural casings, as distinguished from artificial or synthetic casings, are prepared from the intestines of edible animals, such as cattle, swine, and sheep. After the intestines are removed from the carcass, they are cleaned and a tubular membrane appropriate for sausage casings is obtained.

Sheep casings command a higher price because they generally possess more desirable physical properties than hog casings, Indian sheep casings and beef casings. Hog casings are suited for the manufacture of frankfurters and other sausages similar in size, but because of physical characteristics they cannot be successfully used in the manufacture of high grade frankfurters and fresh pork sausages because the casing is objectionable, being difficult to masticate. The same is true of Indian sheep casings and beef casings. Moreover, the casing is the most difficult part of the sausage to digest, and it is also highly desirable to have a casing possessing a greater stretchability so that the ratio of casing to sausage meat may be reduced to as low a point as possible.

The present invention contemplates the treatment of animal tissue including natural casings prepared from animal intestines with pineapple juice or with an aqueous solution of bromelin, the proteolytic enzyme present in pineapple juice, and controlling the action of the bromelin on the tissue in such a way that the desired physical properties of the tissue are improved efficiently and quickly without undue digestion or other undesirable effects.

We are aware that it has been proposed heretofore to treat meat with certain enzymes to obtain tendering. For example, the patent to Paddock et al., United States Patent No. 2,043,392, discloses the injection of proteolytic enzymes into the vascular system of carcass beef and then holding the treated product under refrigeration. There is no disclosure in that patent of treating natural casings with an enzyme nor the treatment of animal tissue under the conditions of the present invention whereby applicants' results could be obtained. The patent to Marcano, United States Patent No. 441,181, discloses the preparation of a meat peptone in which the meat is completely disintegrated into a liquid or soluble pasty form. The Marcano patent has no disclosure of tendering any kind of animal tissue.

According to the present invention, animal tissue is treated with pineapple juice or bromelin under conditions of treatment including strength of the enzymatic solution, temperature and time, coupled with steps of operation whereby new and different results from the prior art are obtained.

The pineapple juice or bromelin solution may be prepared from fresh or frozen pineapple juice, which has not been subjected to a temperature sufficiently high to destroy its enzymic action. Solutions containing about one part of pineapple juice to about five or six parts or more of water are often used under the conditions of treatment herein specified, although satisfactory results may be obtained by using one part of pineapple juice to about one to fifteen parts of water. The concentrations vary with the nature of the tissue treated and the other conditions such as time, temperature, and method of operation.

Bromelin may be isolated from pineapple juice by any method suitable for the isolation of a proteolytic enzyme. These methods include precipitation with ethyl alcohol, acetone, methyl alcohol, salts and the like. Solutions containing bromelin equivalent to pineapple juice in concentrations of about 5 per cent to 100 per cent which are believed to contain about 0.002 to 0.05 per cent of active bromelin are usually employed. For example, solutions containing about 0.035 per cent of active bromelin are usually satisfactory, although solutions containing bromelin in larger amounts, for example, 0.05 per cent or more are contemplated for our use. Solutions of the lower range are usually used for treating meat. Solutions of the higher range are more satisfactory for treating intestinal tissue such as natural casings.

In the use of a solution of bromelin, it has been found that bromelin is most active when employed in a solution having a hydrogen ion concentration approximating that of the pineapple juice, which may vary from around pH 3.5 to around pH 5.5, for example, about pH 4. Bromelin is active when used in solutions over a wide range of hydrogen ion concentration, although it is desirable to maintain the pH value below 7. The activity of the bromelin is reduced substantially in solutions having higher pH values and furthermore, for the advantages in dye absorption and preventing putrefaction, it is desirable to avoid an alkaline reaction on the meat.

The pineapple juice or solution of bromelin may be applied to the tissue in any suitable manner as by washing, soaking, injecting, spraying, dipping or wiping.

It will be understood that the time of treatment, the temperature of treatment, and the concentration of the solution are all variable and should be adjusted to secure the desired extent of tendering, which is dependent upon the type and the initial toughness of the tissue. The activity of bromelin increases with increasing temperature until a condition of rapid activity is reached at temperatures between about 140 degrees and 160 degrees F. The bromelin activity is destroyed at a temperature of approximately 170 degrees F.

The product previously treated by the method described hereinbefore is preferably subjected to a temperature between 60 degrees and 140 degrees F. and maintained at such temperature in contact with the pineapple juice or bromelin previously applied for a sufficient length of time to permit the enzyme to react whereby the desired alteration in physical properties is effected. The temperature is then raised to a point sufficiently high, for example, to a temperature between about 165 degrees and 175 degrees F. to destroy the enzyme and avoid excessive action on the tissue. As an alternative method, the treated product may be thoroughly flushed with water before or after the final heat treatment to remove the major portion of the juice or solution. The action of the enzyme may be terminated by other means than heating or washing, such as the application of a suitable chemical reagent.

In the treatment of meat tissue the enzyme solution may be applied to the meat by any of the foregoing methods. The previously treated meat is then held at a temperature of above about 60 degrees F. and within the range of enzymic activity until the desired degree of tenderization takes place. The temperature of the meat is then raised to a point at which the treating enzyme is substantially inactivated. This tenderization process may be accomplished by gradually heating the meat to which the enzyme has been applied from room temperature to cooking temperature and finally enzyme inactivation temperature. The temperature rise through the gradient is at such a rate that the meat is tenderized by the enzyme in its active range. When the desired degree of tendering results, the temperature is substantially raised to stop further enzymatic action. The type, toughness and size of the meat cut, and the activity of the enzyme solution determine the time and temperature of heat treating.

As an illustration of the tenderizing of meat by this process, a normally tough muscle from the hind shank of one side of a beef carcass (peroneus tertius) was treated with an enzyme solution containing about 0.035 per cent of bromelin preparation by injecting it into the primary artery supplying the circulatory system of the cut. The amount of enzyme solution injected was about 8% of the muscle weight. The enzyme-treated muscle and an untreated control muscle from the companion side of the carcass were cut into slices about one-half inch thick. These slices were heated gradually from room temperature to a temperature of about 160 degrees F. in about ten to fifteen minutes. The enzyme was then inactivated by quickly raising the temperature substantially above this value. The cooked, treated product was compared with the cooked control. In all cases the treated muscle slices were tender whereas the control muscle slices were tough.

It is possible to similarly prepare previously treated beef rounds to obtain steaks and roasts which when heat treated first in the active enzyme temperature range followed by a high heat treatment to inactivate the enzyme will yield cooked cuts substantially more tender than those not so treated with enzymes. In all these treatments the steaks and roasts are fried, broiled or roasted to an inside temperature of at least 160 degrees F. and tenderness comparisons made on the cooked meat. Of course with these larger cuts longer periods of treatment are generally necessary, for example, up to 45 minutes to one hour or more in order to raise the temperature of the meat through the active enzyme range. In treating the beef rounds the enzyme solution may be introduced into the cut by means of hypodermic needles until the desired amount of enzyme solution based on the weight of muscle is obtained.

For example, a solution consisting of 15 per cent pineapple juice and 85 per cent water or an equivalent aqueous solution of bromelin may be injected by needles into the cuts of meat or into the circulatory system of a meat cut or a carcass in an amount equal to about 6 per cent of the weight of the meat to prepare the meat for the heat tenderizing treatment.

In the treatment of sausage casings, the natural pineapple juice may be applied to the casing in any suitable manner as by washing or soaking the casings in the solution, adding the bromelin or pineapple juice to the sausage cook water or spraying, dipping, or wiping the casing with the bromelin solution or pineapple juice after the casing has been stuffed with sausage meat. The casing may be treated, however, before or after stuffing and greater improvement in stretchability is sometimes obtained by treatment before stuffing.

The previously treated casing, for example, may be heated to a temperature between about 110 degrees and 140 degrees F. and maintained at such temperature for a sufficient length of time to permit the enzyme to attack the tissue, for example, ½ to 3 hours. The temperature is then raised to a point high enough to destroy the major portion of the enzyme and avoid excessive action on the casing.

The present invention may be practiced by treating the casings after stuffing as well as before stuffing. In the treatment of casings after stuffing, basins or receptacles may be placed at the end of a conventional stuffing table. One basin is equipped with an overflow and warm water is passed continuously through the basin, the other basin may serve as a receptacle for the pineapple juice or dilute solution or bromelin. A satisfactory solution may be prepared containing about one part of pineapple juice to six parts of water by volume and is placed in the proper receptacle. After the sausages are stuffed and linked, the operator dips the sausages in the warm running water basin, immersing the sausages two or three times to rinse off particles of meat from the surface of the casings. The sausages are then immersed two or three times in the pineapple juice solution, care being taken to have the solution reach all portions of the outside surface of the casings.

In the commercial treatment of natural casings, we prefer to spray the stuffed casings with a solution of pineapple juice containing one part of pineapple juice and from one to fifteen parts of water, preferably one part pineapple juice to eight parts of water, or an equivalent aqueous solution of active bromelin. The concentration of the solution will vary with the type of casing which is to be treated. It will be understood, of course, that the time of treatment, the temperature of treatment, and the concentration of the solution are all variable and may be adjusted at will to secure the desired alterations in the physical properties of the casings, and is dependent upon the use to which the casings are to be put and the initial properties of the casings.

After the application of the enzyme by any desired method, the product with the enzyme thereon may be placed in a tempering room for a period of about one hour and thirty minutes with an air temperature of from 80 degrees to 120 degrees F., for example, about 80 degrees to 90 degrees F. and a relative humidity of about 80 per cent to 85 per cent. The product is then removed to a preheated smokehouse having temperatures sufficiently high to cure the product, for example, at a temperature of from 120 degrees to 170 degrees F. The product is usually kept in the smokehouse for about 45 minutes up to one or two hours during which time a gradual increase in temperature from about 120 degrees to 150 or 160 degrees F. may be obtained over a period of about 1½ hours. The air temperature, if desired, may be raised to 170 degrees to 200 degrees F., for example, to a temperature of about 170 degrees F. and maintained at this temperature for about 15 minutes. After the curing operation, the product may be cooked in water or steam in which case it is preferable not to exceed a temperature of about 170 degrees F. The preferred cooking treatment, however, is to place the frame with the smoked sausage links in a cooking chamber where the sausages are sprayed with hot water at a temperature of about 170 degrees F. for about 12 to 15 minutes. A direct steam chamber at the same temperature may be employed.

In some instances it may be desirable to omit the separate tempering or conditioning step and to secure the tempering and smoking in one operation. When the tempering and smoking take place in one operation, the temperatures in the smoke house may be raised through a wide range at least a portion of which is in the field of enzyme activity and the temperature rise through the gradient may be rather slow.

The treatment of natural casings according to the present invention produces a product of greatly improved tenderness. For example, ordinary untreated casings are often so tough that it is difficult to break or puncture a stuffed sausage by bending, biting, chewing or pulling, whereas the casings treated by the present invention are easily broken by bending and may be readily punctured by gentle pressure with a finger or thumb.

The improvement in tenderness of the treated casings may be more precisely shown by penetrometer measurements of the force necessary to puncture sausage casings with steel balls. The penetrometer comprises a steel ball having a diameter of $\frac{7}{8}''$ mounted upon a rod of smaller diameter which is attached to a pressure gauge. In the particular penetrometer employed, the scale was calibrated in one-twentieths of a pound. The following data are representative readings obtained by puncturing untreated casings and treated casings:

| Untreated casings | Treated casings |
|---|---|
| Penetrometer reading | Penetrometer reading |
| 92 | 54 |
| 74 | 56 |
| 88 | 63 |
| 86 | 53 |
| 75 | 63 |
| 84 | 56 |

The deviation in penetrometer readings of the untreated casings was 18 whereas the deviation in the case of the treated casings was 10. This data show quite clearly that the treatment of the casings produces a more uniform as well as tenderer product.

In a more comprehensive test of other groups of casings similar results were obtained. In a statistical analysis of these data, it was found that the standard deviation between treated casings is about one-half as great as the standard deviation between untreated casings. The following table illustrates the results obtained in tests of 140 samples of treated casings and untreated casings:

| No. of samples | Character of sample | Average reading | Standard deviation |
|---|---|---|---|
| 140 | Treated | 75.7 | 11.9 |
| 140 | Untreated | 122.2 | 22.8 |

The process of the present invention also produces other improved properties in the treated casing. Among these are increased translucency and improved smoking properties. These improved properties appear to be due at least in part to an increased quantity of water absorbed by the casing. The treatment of a casing with pineapple juice or a dilute aqueous solution of bromelin produces a noticeable tendency for the casing to swell accompanied by a marked increase in the amount of water absorbed by the casing. As a result, smoke penetrates the wet surface more rapidly and to a greater extent than the drier surface of an ordinary casing. Moreover, the casing dries out more slowly than an untreated casing and, as a result, provides a longer effective smoke period due to the more rapid and continued penetration of the smoke.

The increase in the water absorbing property of treated casings as compared to untreated casings may be illustrated by the data given below. Casings graded to the same size were selected, one group being handled in the normal conventional manner, the other group being treated in accordance with the present invention. In the treatment of the casings in accordance with conventional practice, the salted casings were soaked in water to remove the salt and were then flushed with water. The other group of casings was soaked in water for about 30 minutes to remove the salt, treated with a pineapple juice solution consisting of about one part of pineapple juice to six parts of water at a temperature of from 70 degrees to 75 degrees F. for about two hours and then flushed with water. The percentage gain in weight of the treated and untreated casings was found to be as follows:

| Untreated casings, per cent gain | Treated casings, per cent gain |
|---|---|
| 42 | 88 |
| 38 | 114 |
| 35 | 102 |
| 28 | 72 |
| 33 | 75 |
| 33 | 71 |
| Average 35 | 87 |

Furthermore, the treatment of natural casings in accordance with our invention increases the stretchability of the casings and thereby increases the stuffing capacity of the casings. In the data which follow, casings graded to the same size were handled as described above to prepare the casings for stuffing. All of the casings were then subjected to the identical stuffing operation, and, after stuffing, the diameter of the casings was measured. Each of the figures in the table which follows represents the average diameter of sausage prepared from a bundle of casings, each of the bundles containing 102 yards of casing.

| Untreated casings | Treated casings |
|---|---|
| Mm. | Mm. |
| 28.1 | 31.2 |
| 28.5 | 30.7 |
| 28.5 | 31.1 |
| Average 28.4 | 31.0 |

The sausages were also weighed to obtain the weight of sausage meat. The data in the table which follows represent the weight of the stuffed casing per standard bundle of 102 yards of casing.

| Untreated casings | Treated casings |
|---|---|
| Pounds | Pounds |
| 105.0 | 110.5 |
| 107.5 | 120.0 |
| 92.0 | 112.0 |
| Average 101.8 | 114.2 |

The increase in stuffing capacity in the foregoing groups of casings was approximately 11 per cent. The increase in stuffing capacity will, in general, vary from about 8 per cent to about 15 per cent depending upon the characteristics of the casings, concentration of pineapple juice used, and upon the length of the period of treatment of the casings. The above data illustrate a representative increase in the stretchability and stuffing capacity of casing treated in accordance with this invention.

The treatment of the casings with pineapple juice or an aqueous solution of bromelin also renders the casings more slippery than conventional casings. Before stuffing, casings are placed upon or threaded on a stuffing horn and it is desirable to have the casing as slippery as possible so that it may be easily threaded on the stuffing horn. In conventional practice, a water connection is provided on the stuffing table and the operator places the casing over the water nozzle and admits a small amount of water prior to threading the casing upon the stuffing horn. Casings treated in accordance with our invention may be placed on the stuffing horn without first admitting a small amount of water to the casing.

The dye absorption properties of the casings are also improved by the present process in that the casings require a smaller concentration of dye to produce the same intensity of color as compared to untreated casings. This is important when the product is labeled by stamping using a dye for the purpose.

This application is a continuation in part of our application, Serial No. 301,957, filed October 30, 1939, which application is a continuation in part of our application Serial No. 225,566, filed August 18, 1938.

Obviously many modifications and variations of the invention hereinbefore set forth may be made without departing from the spirit and scope thereof, and therefore only such limitations should be imposed as are indicated in the appended claims.

We claim:

1. The process for the treatment of animal tissues, which comprises subjecting the tissue to the action of bromelin in sufficient amount to cause tenderizing of the tissue for a time sufficient to obtain substantial tenderization without material disintegration of the tissue, maintaining the temperature during the treatment within the range of active enzymic action of the bromelin, and then arresting the action of said enzyme.

2. The process for the treatment of animal tissues to improve the physical properties thereof including tenderization, which comprises applying to the tissue a solution of bromelin of sufficient strength to cause tenderization of the tissue, holding the tissue in contact with the solution of bromelin for sufficient time to obtain a substantial amount of tenderization while maintaining the temperture within the range of active enzymic action of the bromelin solution and then subjecting the treated product to temperatures sufficiently high to arrest the enzymic action of the bromelin.

3. The process according to claim 2 in which the solution of bromelin is an aqueous solution containing bromelin equivalent to about 5 to 100 per cent pineapple juice.

4. The process according to claim 2 in which the solution of bromelin contains pineapple juice.

5. The process for the manufacture of sausage stuffed in natural casings which comprises applying to the sausages a solution containing bromelin in sufficient amount to cause tenderization, permitting said solution to act upon the sausages at a temperature within the active ranges of the bromelin solution for a period of time sufficient to cause a substantial amount of tenderization by the enzymic action of the bromelin but insufficient to cause material disintegration of the casings, and thereafter smoking and cooking the treated product at temperatures sufficiently high to arrest the activity of the bromelin.

6. The process for the treatment of natural casings to improve the physical properties which comprises subjecting the casings to the action of a solution containing bromelin in sufficient amount to cause improvement in the physical properties including the tenderness, maintaining the temperature in the range of active enzymic action of the bromelin for sufficient time to cause substantial improvement in the physical properties of the casings, but insufficient to cause material disintegration of the casings, and then subjecting the treated casings to temperatures sufficiently high to arrest the enzymic activity of the bromelin.

7. The process according to claim 6 in which the reaction temperature of the solution on the casings is within the range of about 60 degrees to 160 degrees F.

8. The process according to claim 6 in which the time of action of the solution on the casing is within the range of about 30 to 180 minutes.

9. The process for the treatment of stuffed natural casings normally tending to be tough which comprises subjecting the stuffed casings to the action of pineapple juice in sufficient amount to cause substantial improvement in the physical properties thereof, maintaining the temperatures of treatment within the range of active enzymic action of said juice for sufficient time to improve substantially the physical properties of the casings including the tenderness but insufficient to cause material disintegration of the casings, and then subjecting the product to smoking and cooking at temperatures sufficiently high to arrest the enzymic activity of the pineapple juice.

10. The process according to claim 9 in which the pineapple juice is an aqueous solution containing between about one part pineapple juice and about one to fifteen parts of water.

11. The process according to claim 9 in which the treating temperature of the pineapple juice on the casings is at least about 60 degrees F. and the treating time is within the range of about 30 to 180 minutes.

12. The process according to claim 9 in which the smoking and cooking temperature is within the range of about 120 degrees to 175 degrees F.

13. The process for the treatment of sausages stuffed in natural casings normally tending to be tough and difficult to smoke, which comprises contacting the sausages with pineapple juice, conditioning the treated sausages at a tempering temperature of at least about 60 degrees F. and below about 160 degrees F. for a period of time sufficient to substantially tenderize said casings without causing material disintegration of the casings while maintaining a relative humidity sufficient to prevent substantial dehydration of the casings, smoking the treated sausage while hot and finally subjecting the resulting product for a short time to temperatures sufficiently high to arrest the enzymatic action of the pineapple juice.

14. A process according to claim 13 in which the temperature of conditioning is at least in part within the range of about 80 degrees and 120 degrees F.

15. A process according to claim 13 in which the relative humidity is about 80 to 85 per cent during the conditioning operation.

16. A process according to claim 13 in which the smoking temperature is at least about 120 degrees F. for at least the major fraction of an hour.

17. A process according to claim 13 in which the final temperature treatment is at least about 170 degrees F. for several minutes.

JOHN M. RAMSBOTTOM.
LEVI S. PADDOCK.